United States Patent
Watanabe et al.

(10) Patent No.: US 6,929,106 B2
(45) Date of Patent: Aug. 16, 2005

(54) MULTIPLATE CLUTCH

(75) Inventors: Takayuki Watanabe, Shimada (JP); Tomoyuki Miyazaki, Kakegawa (JP); Hirotsugu Suzuki, Ogasa-gun (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/676,011

(22) Filed: Oct. 2, 2003

(65) Prior Publication Data

US 2004/0065521 A1 Apr. 8, 2004

(30) Foreign Application Priority Data

Oct. 2, 2002 (JP) ........................................ 2002-289648

(51) Int. Cl.⁷ ...................... F16D 25/0638; F16D 13/64
(52) U.S. Cl. ............................. 192/70.14; 192/85 AA; 192/107 C
(58) Field of Search ........................... 192/52.2, 52.3, 192/52.6, 70.14, 85 AA, 107 R, 107 C; 188/71.5

(56) References Cited

U.S. PATENT DOCUMENTS

| | | | | |
|---|---|---|---|---|
| 2,733,797 A | * | 2/1956 | Almen et al. ........... | 192/107 R |
| 2,927,673 A | * | 3/1960 | Sand ....................... | 192/70.14 |
| 2,968,381 A | * | 1/1961 | Vosler .................... | 192/107 R |
| 3,016,119 A | * | 1/1962 | Rosenberger et al. .... | 192/70.14 |
| 2003/0150686 A1 | * | 8/2003 | Kremer ................... | 192/107 C |

FOREIGN PATENT DOCUMENTS

| | | | |
|---|---|---|---|
| JP | 63-198837 | | 12/1988 |
| JP | 4-8928 A | * | 1/1992 |

* cited by examiner

Primary Examiner—Rodney H. Bonck
(74) Attorney, Agent, or Firm—Crowell & Moring LLP

(57) ABSTRACT

A multiplate clutch is provided with two types of frictionally engaging elements and a piston with plural pressing raised portions formed thereon. The frictionally engaging elements of at least one type are each provided with small waves. The two types of frictionally engaging elements are alternately arranged on two members such that in a state of relative rotation between the two members, rotation is transmitted via the frictionally engaging elements as needed. The waves on each of the frictionally engaging elements of the at least one type are arranged such that positions of swell portions or recess portions of the waves are shifted in phase from positions of the pressing raised portions of the piston.

10 Claims, 6 Drawing Sheets

F I G. 11
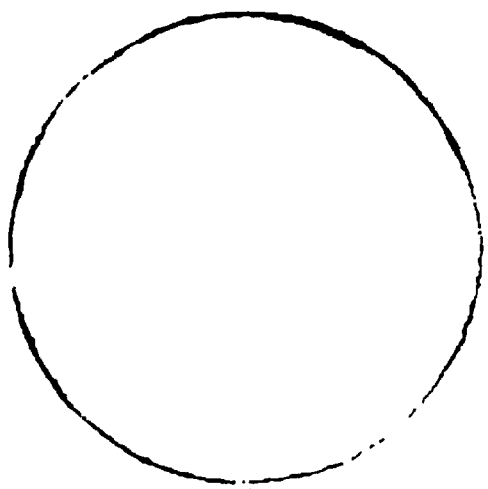

MULTIPLATE CLUTCH

FIELD OF THE INVENTION

This invention relates to a multiplate clutch useful in an automatic transmission.

DESCRIPTION OF THE BACKGROUND

One example of typical wet-type multiplate clutch constructions is illustrated in FIG. 1. A multiplate clutch 10 is equipped with separator plates 3 and friction plates 4 as frictionally engaging elements to transmit rotation between a clutch case 1 and a hub (not shown) between which there is relative rotation. In the illustrated example, the separator plates 3 are maintained at outer peripheries thereof in fitting engagement with the clutch case through splines, while the friction plates are maintained at inner peripheries thereof in fitting engagement with the hub (not shown) through splines.

Designated at numeral 2 is a piston for pressing the frictionally engaging elements to bring the clutch into engagement, and by charging pressure oil into an oil compartment 7 through an oil hole 71, the piston 2 is pressed rightwards. When the pressure oil is discharged from the oil compartment 7, the piston 2 is caused to return leftwards by a return spring 6 interposed between the piston 2 and a piston support 5 so that the binding of the frictionally engaging elements is cancelled. At this time, oil enters between the piston 2 and the piston support 5 through an oil hole 61 under centrifugal force, and acts to press the piston 2 leftwards. FIG. 1 also shows splines 8 through which the clutch case 1 is maintained in fitting engagement with a center shaft (not shown), a stopper ring 9 for preventing any rightward movement of the frictionally engaging elements, and a stopper ring 51 for the piston support 5. An alternating long and short dash line X—X indicates a central axis.

Friction plates and separator plates, as frictionally engaging elements in a multiplate clutch, may be provided with waves to avoid mutual sticking and hence, to reduce a drag torque which is produced upon disengagement of the clutch. When the piston 2 is provided with pressing raised portions 21 as illustrated in FIG. 2, the positions of the pressing raised portions 2 of the piston 2 may, however, happen to register with the positions of swell portions or recess portions of the waves on the frictionally engaging elements as shown in FIG. 5. When such positional registration takes place, the distribution of a bearing stress under a load from the piston 2 becomes uneven. Such an uneven distribution of a bearing stress leads to occurrence of various inconveniences, such as a reduction in the coefficient of friction, production of vibrations and noises and a reduction in torque capacity, upon initiation of frictional engagement.

SUMMARY OF THE INVENTION

An object of the present invention is to evenly apply a bearing stress upon engagement of a multiplate clutch equipped with pressing raised portions and hence, to achieve improvements in frictional characteristics, prevention of noise production, prevention of torque fluctuations, and prevention of a reduction in torque capacity.

In one aspect of the present invention, there is thus provided a multiplate clutch provided with two types of frictionally engaging elements and a piston with plural pressing raised portions formed thereon. At least one type of the frictionally engaging elements is provided with small waves, and the two types of frictionally engaging elements are alternately arranged on two members such that in a state of relative rotation between said two members, rotation is transmitted via said frictionally engaging elements as needed. The waves on each of the frictionally engaging elements of the at least one type are arranged such that positions of swell portions or recess portions of the waves are shifted in phase from positions of the pressing raised portions of the piston.

Owing to the above-described construction, the multiplate clutch according to the present invention can evenly apply a bearing stress upon engagement of the clutch, thereby bringing about advantageous effects such as improvements in frictional characteristics, prevention of noise production, prevention of torque fluctuations, and prevention of a reduction in torque capacity.

BRIEF DESCRIPTION OF THE DRAWINGS

FIG. 11 is a view illustrating a distribution of a bearing stress on a friction plate in the multiplate clutch according to the one embodiment of the present invention.

DETAILED DESCRIPTION OF THE PREFERRED EMBODIMENTS

Figure 1:
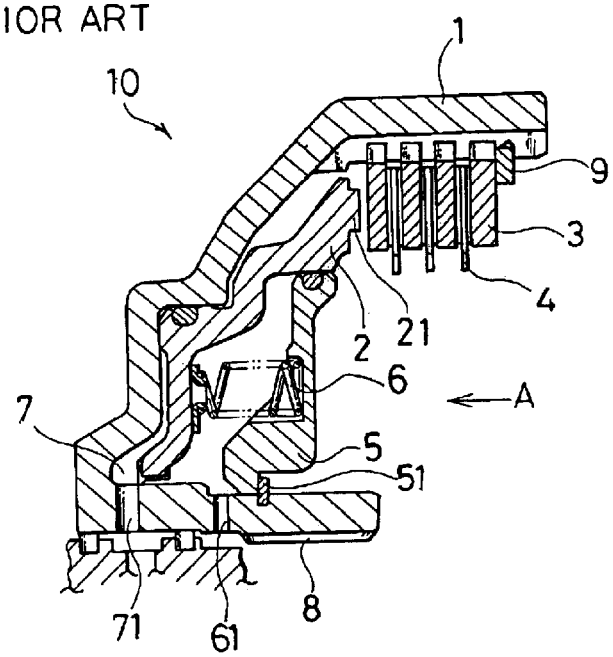
FIG. 1 is an axial cross-sectional view showing the construction of a wet-type multiplate clutch.
Figure 2:
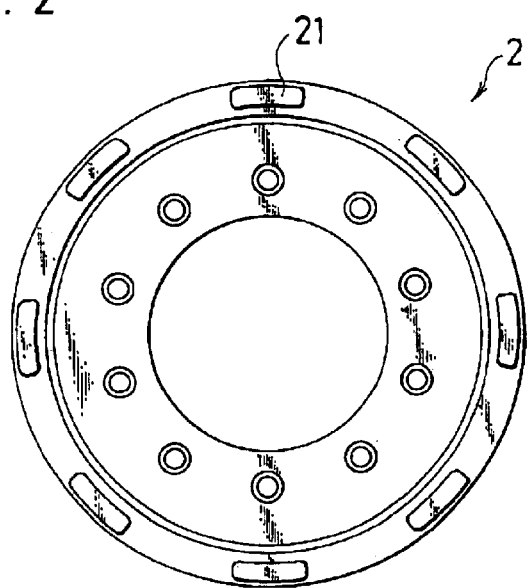
FIG. 2 is a front view of a piston as viewed in a direction A in FIG. 1.
Figure 3:
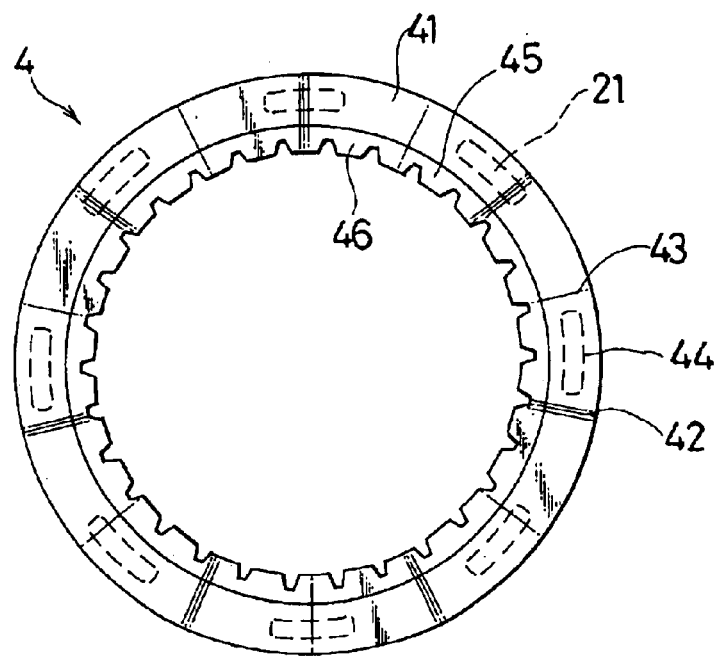
FIG. 3 is a front view illustrating a relationship between waves on a friction plate and the positions of pressing raised portions of a piston in a multiplate according to one embodiment of the present invention.
Figure 4:
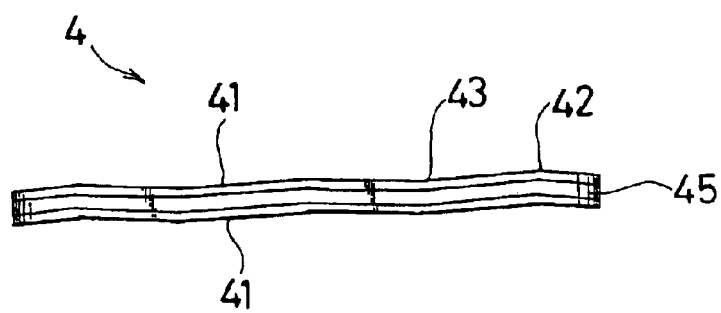
FIG. 4 is a side view of the friction plate in FIG. 3.

As illustrated in FIG. 2 which is a view taken in the direction A of FIG. 1, the piston 2 is provided with pressing raised portions 21 (eight pressing raised portions 21 in the illustrated embodiment) to press the frictionally engaging elements. As also shown in FIGS. 3 and 4 which are front and side views of the friction plate, respectively, the friction plate 4 is composed of a core plate 45 and friction materials 41 bonded on opposite sides of the core plate 45, and is provided on an inner periphery thereof with a spline 46 maintained in fitting engagement with a hub.

Plural waves are formed on the core plate 45, and the friction materials 41 are bonded on the opposite sides of the core plate 45, respectively. The friction plate 4 itself is, therefore, provided with the waves. Numeral 42 indicates swell portions of the waves, while numeral 43 designates recess portions of the waves. As "swell" and "recess" are in a relative relationship which is visible depending on in which direction the friction plate is seen, a combination of a swell portion 42 and a recess portion 43 is defined to make up a single wave in the description of the present invention. Described specifically, there are seven waves in FIG. 3. In the present invention, the pressing positions 44 by the pressing raised portions 21 of the piston 2, said pressing positions 44 being shown by dashed lines in the drawing, and the positions of the swell portions 42 or recess portions 43 of the waves on the friction plate 4 are arranged to always produce a shift in phase therebetween as depicted in FIG. 3. The distribution of a bearing stress can be rendered substantially even, accordingly.

Figure 8:
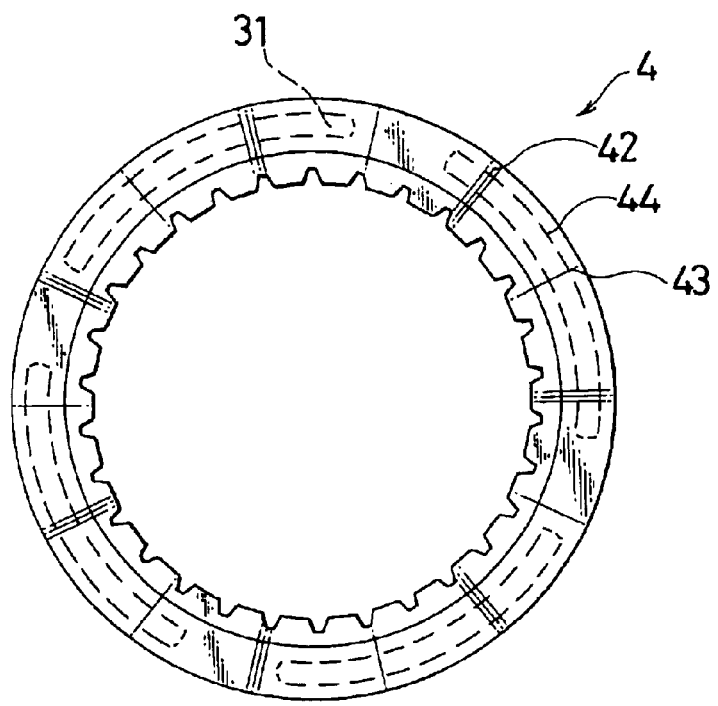
FIG. 8 is a front view showing that the position of each pressing raised portion of a piston extends over its corresponding two waves on a friction plate.
Figure 9:
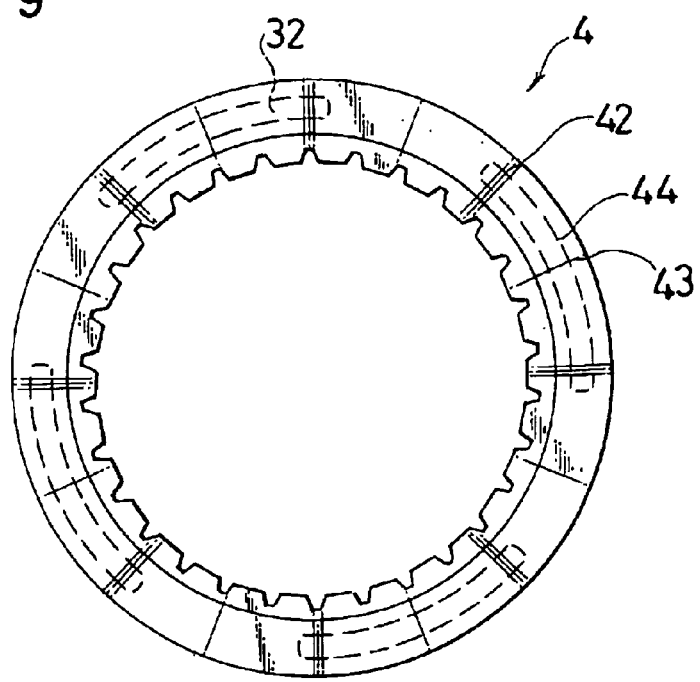
FIG. 9 is a front view showing that the positions of pressing raised portions of a piston are registered in phase with the positions of waves on a friction plate, respectively.

The pressing raised portions of a piston may be constructed such that, as illustrated in FIG. 8, each pressing raised portion extends over two or more of swell portions 42 or recess portions 43 of waves on the friction plate 4. Needless to say, it is also necessary in this construction to set the positional relationship between the pressing raised portions 31 and the swell portions 42 or recess portions 43 of the waves on the friction plate 4 such that they are shifted in phase. The present invention, therefore, excludes such a construction that, as illustrated in FIG. 9, the pressing positions of pressing raised portions 32 of a piston 2 and the swell portions 42 or recess portions 43 of waves are registered in phase with each other.

Concerning the number of the pressing raised portions 21 or 31 on the piston and the number of the waves, one of the numbers may be an even number and the other number may be an odd number. At least the pressing raised portions or the waves may be arranged unevenly on and along a circle. Further, the frictionally engaging elements may be provided with different numbers of waves, respectively.

It is also to be noted that in the present invention, the pressing raised portions of the piston are not limited to the raised portions shown in FIG. 2 and the pressing portions can be formed as a whole in a ring shape or in a partially cut-off, substantially ring shape.

The frictionally engaging elements may also be constructed such that the waves on the adjacent, frictionally engaging elements are shifted in phase from each other. The term "adjacent" in this content means not only a situation that the frictionally engaging elements are directly adjacent to each other as in the case of a friction plate and its associated separator plate but also another situation that, where only friction plates are provided with waves and separator plates are provided with no waves, two of the friction plates are arranged with one of the separator plates interposed therebetween.

Figure 6:
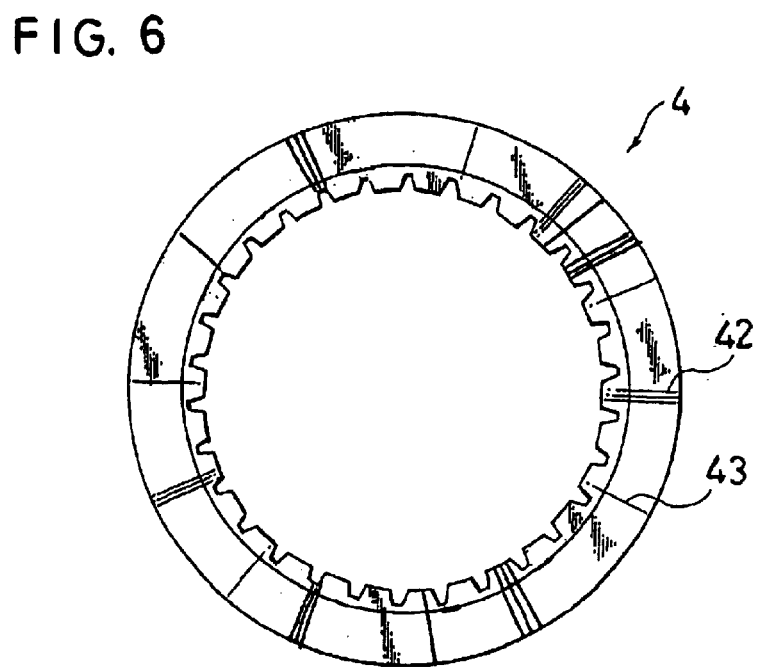
FIG. 6 is a front view of a friction plate with seven waves unevenly arranged thereon.
Figure 7:
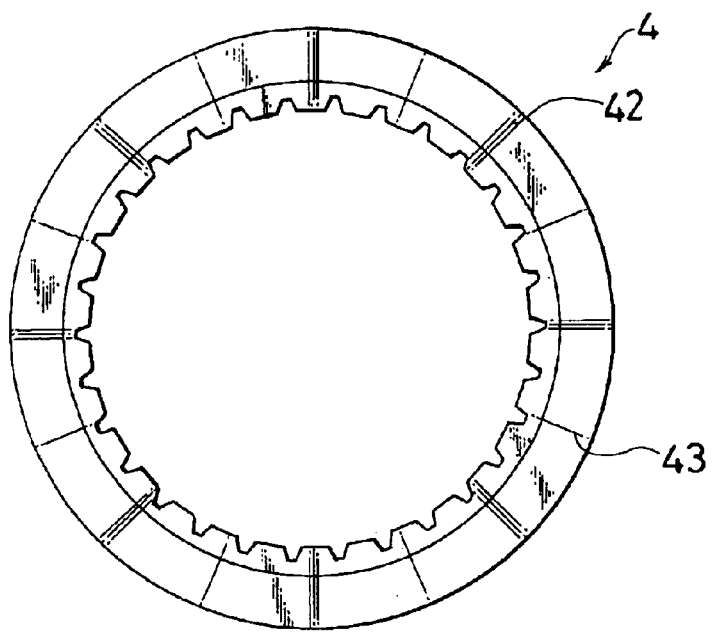
FIG. 7 is a front view of a friction plate with eight waves evenly arranged thereon.

In the embodiment shown in FIG. 3, the pressing raised portions 21 are arranged as many as eight at equal intervals on the piston 2 while the waves are arranged as many as seven at equal intervals on the friction plate. FIG. 6, on the other hand, shows the friction plate 4 with seven waves arranged at non-equal intervals thereon. Further, FIG. 7 illustrates the friction plate 4 with eight waves arranged at equal intervals thereon.

To shift waves in phase between friction plates, the friction plates may be shifted in spline engagement positions from each other. As Examples 1–7, a piston with eight pressing raised portions arranged at equal intervals thereon, friction plates each of which is provided with seven waves arranged at equal intervals thereon, friction plates each of which is provided with seven waves arranged at non-equal intervals thereon, friction plates each of which is provided with eight waves arranged at equal intervals thereon, friction plates with no waves arranged thereon, and the like were hence combined in various ways as summarized in Table 1.

TABLE 1

| Ex. | Piston | SP1 | FP1 | SP2 | FP2 | SP3 | FP3 | SP4 |
|---|---|---|---|---|---|---|---|---|
| 1 | Eight pressing raised portions arranged at equal intervals | 0* | Seven waves arranged at equal intervals | 0* | Seven waves arranged at equal intervals | 0* | Seven waves arranged at equal intervals | 0* |
| 2 | Eight pressing raised portions arranged at equal intervals | 0* | Seven waves arranged at non-equal intervals | 0* | Seven waves arranged at non-equal intervals | 0* | Seven waves arranged at non-equal intervals | 0* |
| 3 | Eight pressing raised portions arranged at equal intervals | 0* | Seven waves arranged at equal intervals | 0* | Eight waves arranged at equal intervals | 0* | Seven waves arranged at equal intervals | 0* |
| 4 | Eight pressing raised portions arranged at equal intervals | 0* | Seven waves arranged at non-equal intervals | 0* | Eight waves arranged at equal intervals | 0* | Seven waves arranged at non-equal intervals | 0* |
| 5 | 0** | 0* | Eight waves arranged at equal intervals | 0* | Seven waves arranged at equal intervals | 0* | Eight waves arranged at equal intervals | 0* |
| 6 | 0** | 0* | Eight waves arranged at equal intervals | 0* | Seven waves arranged at non-equal intervals | 0* | Eight waves arranged at equal intervals | 0* |
| 7 | 0** | 0* | Eight waves arranged at equal intervals | 0* | Eight waves arranged at equal intervals + spline positions shifted | 0* | Eight waves arranged at equal intervals | 0* |

In Table 1, the single asterisk (*) means that the separator plate was provided with no waves, and the double asterisk (**) means that the piston was provided with a substantially ring-shaped, pressing raised portion. "SP1" to "SP4" stand for "the $1^{st}$ to $4^{th}$ separator plates arranged in this order from the side of the piston", while "FP1" to "FP3" stand for the $1^{st}$ to $3^{rd}$ friction plates arranged in this order from the side of the piston". The expression "spline positions shifted" in Example 7 indicates that the $2^{nd}$ friction plate as counted from the side of the piston was maintained in fitting engagement with a spline such that the positions of its waves were shifted in phase from the positions of the waves on the 1st and 3rd friction plates as counted from the side of the piston.

Figure 5:
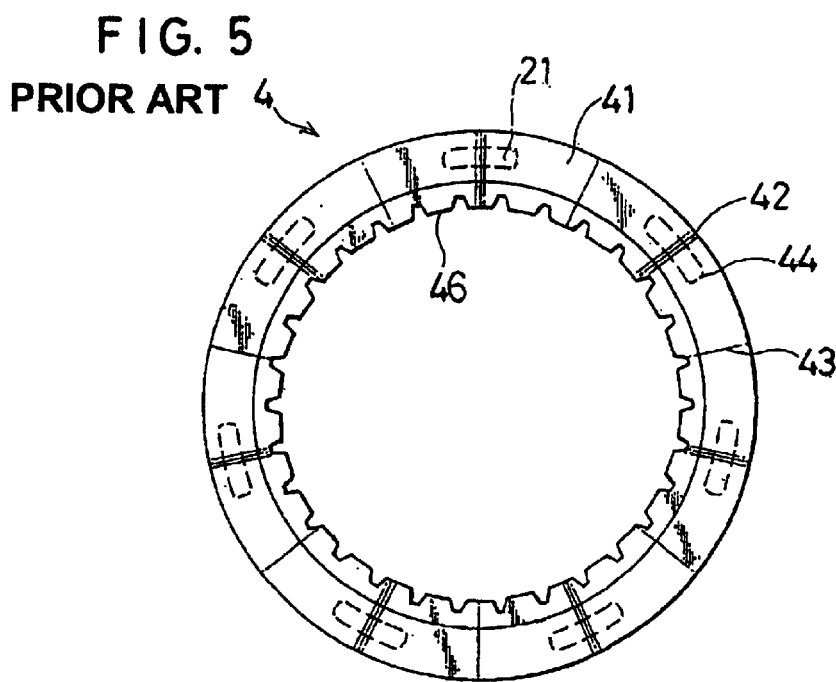
FIG. 5 is a front view illustrating a relationship between waves on a friction plate and the positions of pressing raised portions of a piston in a conventional multiplate clutch.
Figure 10:
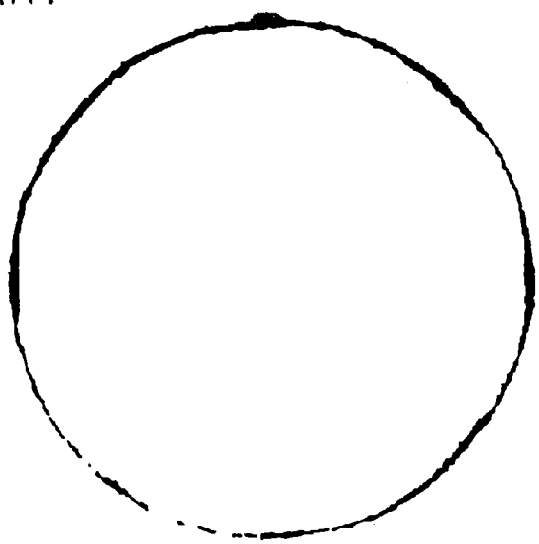
FIG. 10 is a view illustrating a distribution of a bearing stress on a friction plate in a conventional multiplate clutch.

FIG. 10 and FIG. 11 illustrate experimental results. Specifically, FIG. 10 illustrates a distribution of a bearing stress when, as shown in FIG. 5, the pressing raised portions 21 of the piston 2 and the swell portions 42 of the waves on the friction plate 4 were registered in phase with each other. FIG. 11, on the other hand, illustrates a distribution of a bearing stress when, as shown in FIG. 3, the number of the pressing raised portions 21 of the piston and the number of waves on the friction plate 4 are different from each other. As readily appreciated from a comparison between FIG. 10 and FIG. 11, it is evident that the present invention makes it possible to produce an evenly-distributed bearing stress between frictionally engaging elements.

It should be borne in mind that embodiments of the present invention are not necessarily limited to those described in the above. For example, separator plates may be provided with waves. The present invention can also be applied to so-called single-sided, alternating multiplate clutches of the construction that friction materials are fixed on one sides of plates provided on outer peripheries thereof with spline teeth (externally-toothed plates), friction materials are fixed on one sides of plates provided on inner peripheries thereof with spline teeth (internally-toothed plates), and these externally-toothed plates and internally-toothed plates are alternately arranged. Needless to say, waves may be arranged at least on the externally-toothed plates or on the internally-toothed plates.

Further, the number of pressing raised portions of a piston and the number of the swell portions or recess portions of waves on fictionally engaging elements can be set as desired. In addition, the number of pressing raised portions on a piston and the number of waves on frictionally engaging elements may be set equal to each other provided that they are arranged at non-equal intervals such that the pressing raised portions and the waves are shifted in phase from each other.

This application claims the priority of Japanese Patent Application 2002-289648 filed Oct. 2, 2002, which is incorporated herein by reference.

What is claimed is:

1. A multiplate clutch provided with two types of frictionally engaging elements and a piston with plural pressing raised portions formed thereon, at least one type of said frictionally engaging elements being provided with waves, and said two types of frictionally engaging elements being alternately arranged on two members such that in a state of relative rotation between said two members, rotation is transmitted via said frictionally engaging elements as needed, wherein said waves on each of said frictionally engaging elements of said at least one type are arranged such that positions of swell portions or recess portions of said waves are shifted in phase from positions of said pressing raised portions of said piston.

2. A multiplate clutch according to claim 1, wherein one of a number of said swell or recess portions on each frictionally engaging element of said at least one type and a number of said pressing raised portions on said piston is an even number, and the other one is an odd number.

3. A multiplate clutch according to claim 1, wherein at least one of said swell or recess portions on each frictionally engaging element of said at least one type and said pressing raised portions on said piston are arranged unevenly on and along a circle.

4. A multiplate clutch according to claim 1, wherein at least two frictionally engaging elements which are different in the number of swell portions or recess portions are provided.

5. A multiplate clutch provided with two types of frictionally engaging elements, at least one type of said frictionally engaging elements being provided with waves, and said two types of frictionally engaging elements being alternately arranged on two members such that in a state of relative rotation between said two members, rotation is transmitted via said frictionally engaging elements as needed, wherein said frictionally engaging elements provided with waves out of said frictionally engaging elements are each arranged such that positions of said swell portions or recess portions of its waves are shifted in phase from positions of said swell portions or recess portions of an adjacent one of said frictionally engaging elements provided with waves.

6. A multiplate clutch provided with two types of frictionally engaging elements, at least one type of said frictionally engaging elements being provided with waves, and said two types of frictionally engaging elements being alternately arranged on two members such that in a state of relative rotation between said two members, rotation is transmitted via said frictionally engaging elements as needed, wherein said frictionally engaging elements provided with waves out of said frictionally engaging elements are each arranged such that positions of said swell portions or recess portions of its waves are shifted in phase from positions of said swell portions or recess portions of an adjacent one of said frictionally engaging elements provided with waves and wherein said frictionally engaging elements provided with waves out of said frictionally engaging elements are each provided with said waves such that said swell portions or recess portions of its waves are different in number from said swell portions or recess portions of said waves on an adjacent one of said frictionally engaging elements provided with said waves.

7. A multiplate clutch provided with two types of frictionally engaging elements, at least one type of said frictionally engaging elements being provided with waves, and said two types of frictionally engaging elements being alternately arranged on two members such that in a state of relative rotation between said two members, rotation is transmitted via said frictionally engaging elements as needed, wherein said frictionally engaging elements provided with waves out of said frictionally engaging elements are each arranged such that positions of said swell portions or recess portions of its waves are shifted in phase from positions of said swell portions or recess portions of an adjacent one of said frictionally engaging elements provided with waves and wherein one of a number of said swell or recess portions on each of frictionally engaging elements provided with said waves and a number of said swell or recess portions on an adjacent one of said frictionally engaging elements provided with said waves is an even number, and the other one is an odd number.

8. A multiplate clutch provided with two types of frictionally engaging elements, at least one type of said frictionally engaging elements being provided with waves, and said two types of frictionally engaging elements being alternately arranged on two members such that in a state of relative rotation between said two members, rotation is transmitted via said frictionally engaging elements as needed, wherein said frictionally engaging elements provided with waves out of said frictionally engaging elements are each arranged such that positions of said swell portions or recess portions of its waves are shifted in phase from positions of said swell portions or recess portions of an adjacent one of said frictionally engaging elements provided with waves and wherein in at least one of adjacent ones of said frictionally engaging elements provided with said waves, positions of said swell or recess portions are arranged unevenly on and along a circle.

9. A multiplate clutch provided with two types of frictionally engaging elements, at least one type of said frictionally engaging elements being provided with waves, and said two types of frictionally engaging elements being alternately arranged on splines formed on two members such that in a state of relative rotation between said two members, rotation is transmitted via said frictionally engaging elements as needed, wherein said frictionally engaging elements provided with waves out of said frictionally engaging elements are arranged such that positions of swell portions or recess portions on said frictionally engaging elements provided with waves are shifted in phase; and said frictionally engaging elements provided with waves are each arranged such that positions of said swell portions or recess portions of its waves are shifted in phase from positions of said swell portions or recess portions of an adjacent one of said frictionally engaging elements provided with waves.

10. A multiplate clutch provided with two types of frictionally engaging elements, at least one type of said frictionally engaging elements being provided with waves, and said two types of frictionally engaging elements being alternately arranged on splines formed on two members such that in a state of relative rotation between said two members, rotation is transmitted via said frictionally engaging elements as needed, wherein said frictionally engaging elements provided with waves out of said frictionally engaging elements are arranged such that positions of swell portions or recess portions on said frictionally engaging elements provided with waves are registered in phase; and said frictionally engaging elements provided with waves are each arranged such that positions of said swell portions or recess portions of its waves are shifted in phase from positions of said swell portions or recess portions of an adjacent one of said frictionally engaging elements provided with waves.

\* \* \* \* \*